May 7, 1929.  C. D. EHRET  1,711,879
SHIP GUIDING METHOD AND APPARATUS
Filed Dec. 6, 1920   3 Sheets-Sheet 2
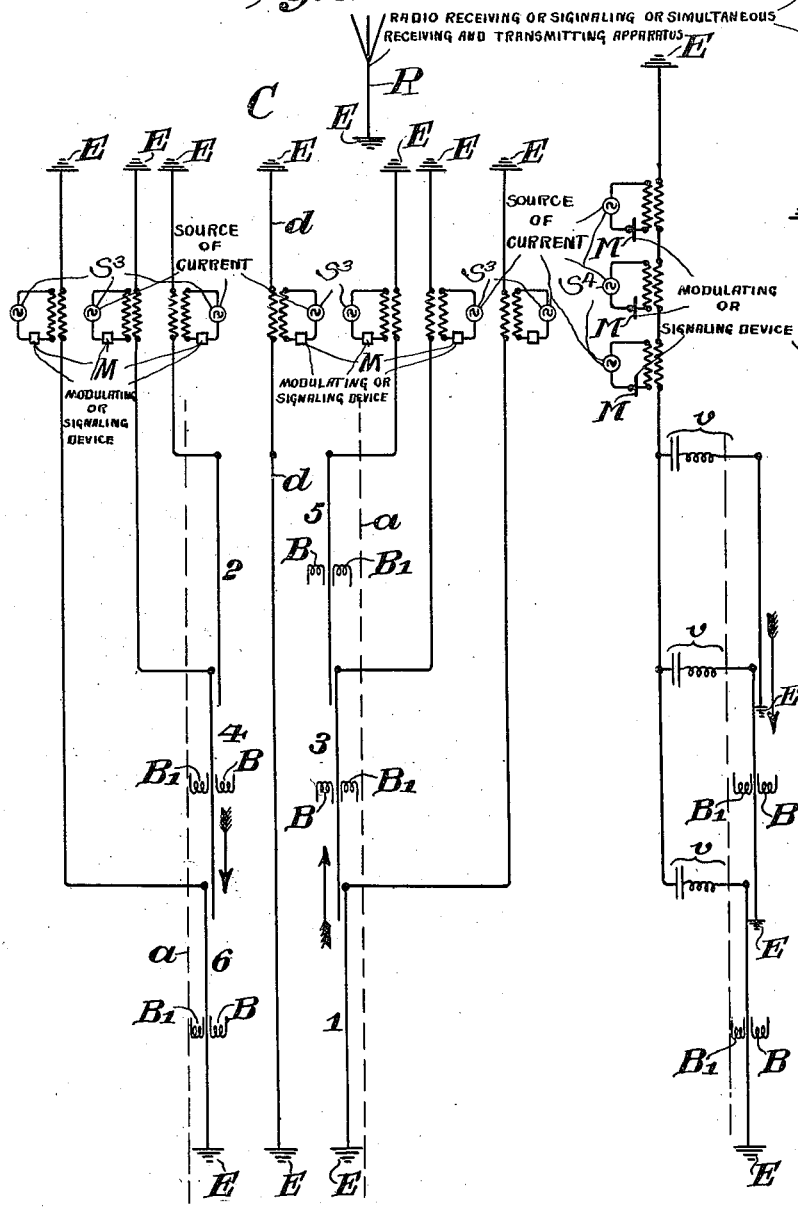
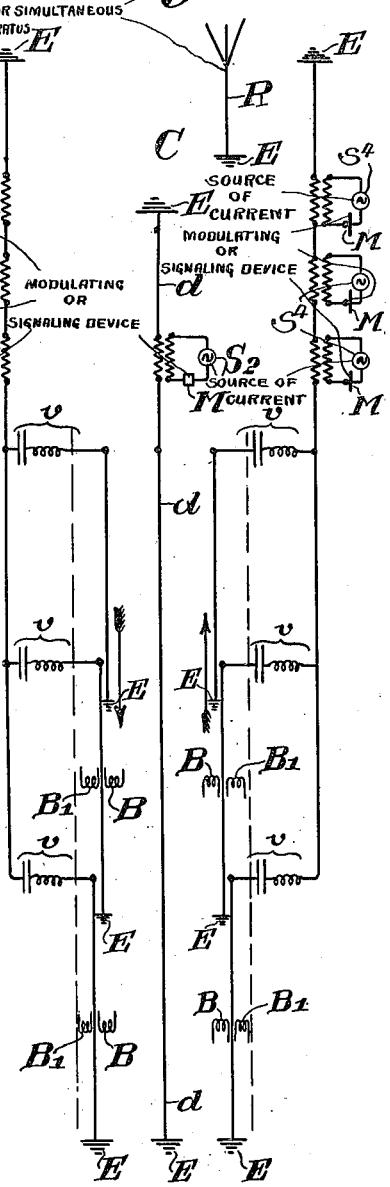
INVENTOR.
Cornelius D. Ehret May 7, 1929.  C. D. EHRET  1,711,879
SHIP GUIDING METHOD AND APPARATUS
Filed Dec. 6, 1920   3 Sheets-Sheet 3
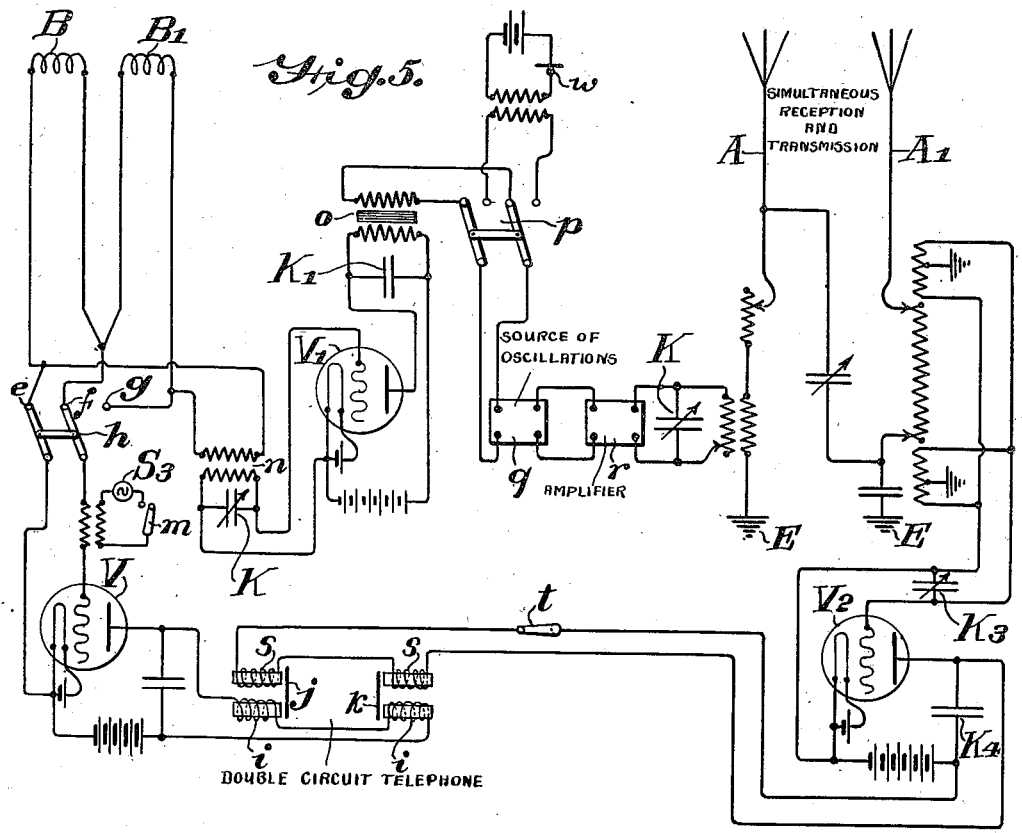
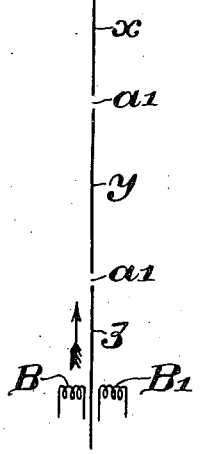
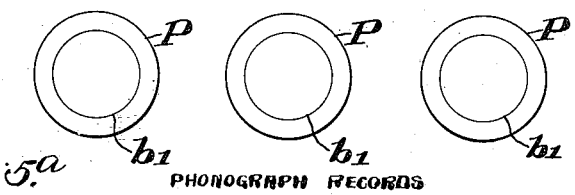
INVENTOR.
Cornelius D. Ehret Patented May 7, 1929.

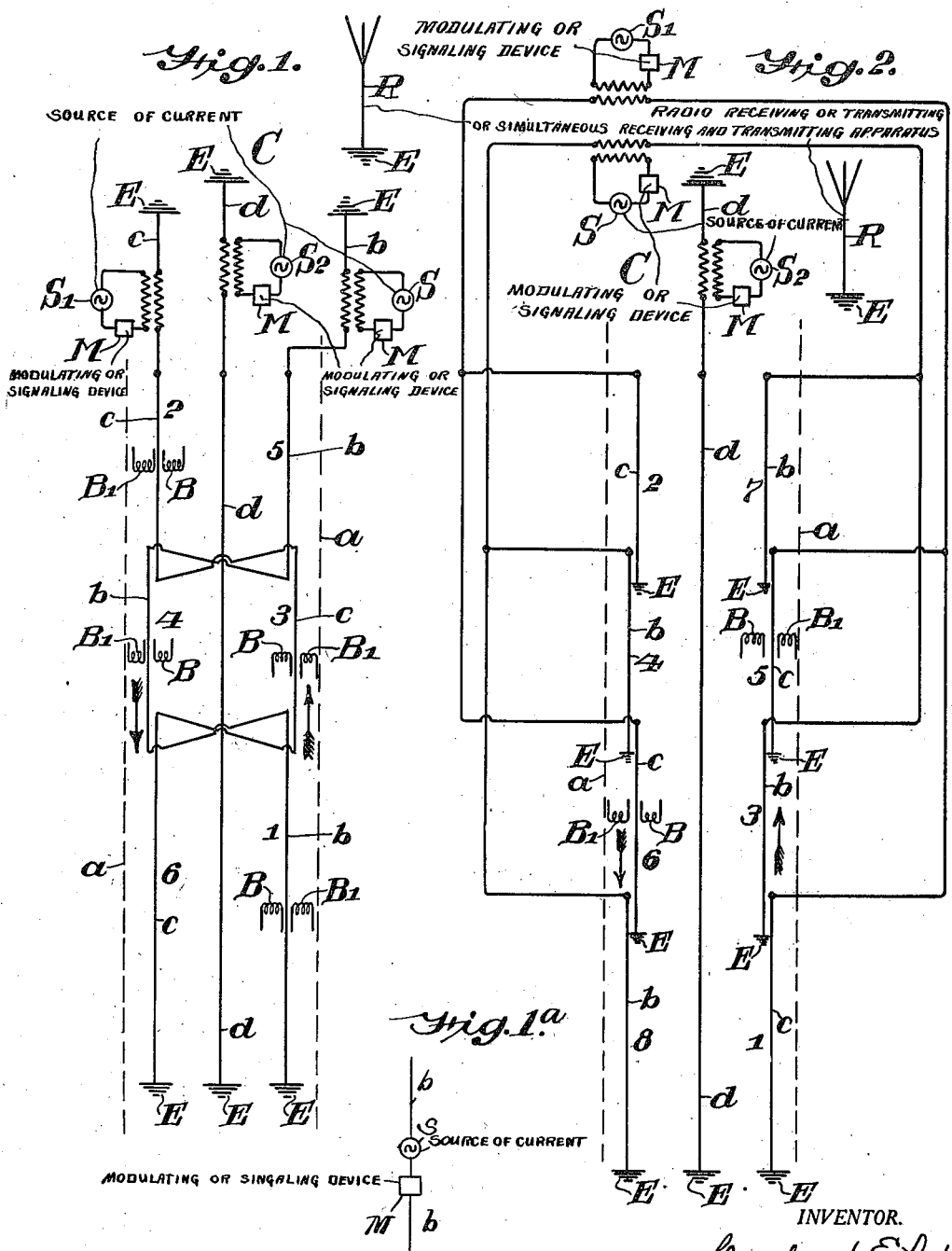

1,711,879

UNITED STATES PATENT OFFICE.

CORNELIUS D. EHRET, OF PHILADELPHIA, PENNSYLVANIA.

SHIP-GUIDING METHOD AND APPARATUS.

Application filed December 6, 1920. Serial No. 428,589.

My invention relates to a method and apparatus for guiding a ship by signals, telegraphic, telephonic or otherwise, communicated thereto from conductors in or adjacent its path.

In accordance with my invention electric impulses, or fluctuating or alternating currents of different characters, as of audible or inaudible frequencies, are impressed upon different sections or blocks of conductor submerged in or adjacent the channel, or otherwise disposed adjacent the path of travel of the ship, whereby it becomes known on the ship in what section or block the ship is at any time, and when it is leaving one block and entering another.

In accordance with my invention, the aforesaid conductor sections may also be employed as a guide to enable a person upon the ship to steer it in a predetermined course or channel, as in darkness, fog or other adverse weather conditions.

In accordance with my invention, there may be employed an additional conductor carrying current of predetermined characteristic and disposed adjacent or substantially parallel with the ship guiding conductor to serve a warning, if the ship should materially depart from its true course or channel.

In accordance with my invention, the signals received upon the ship may be employed to control or modulate electro-radiant energy of a radio transmitting apparatus upon the ship, whereby ships in other blocks or sections will automatically become advised of the presence in a certain block or section of the ship having thereon said transmitting apparatus; and said transmitting apparatus may serve also to advise an operator at the control or terminal station of the system of the presence of the ship in a particular block, and such operator may then communicate the information to ships in other blocks or sections.

In accordance with my invention, the conductor system communicating the aforesaid signals to the ship may be employed also for transmitting to the ship telegraphic or telephonic messages originating at any distance from the terminal or control station, and a person upon the ship may reply or carry on a conversation, as in an ordinary telephone system, by control of the aforesaid transmitting apparatus, the receiving apparatus cooperating therewith at the terminal or control station being then connected to the telegraph or telephone line over which the incoming messages are transmitted to the terminal or control station and from it to the ship.

My invention resides in the method and apparatus hereinafter described and claimed.

For an illustration of some of the various forms my invention may take, and for an understanding of my method, reference is to be had to the accompanying drawings, in which:

Fig. 1 is a diagrammatic view of a conductor system embodying my invention and suitable for carrying out my method.

Fig. 1ª is a diagram of a modified form of connection.

Figs. 2, 3 and 4 are diagrammatic views of modified arrangements.

Fig. 5 is a diagrammatic view of one of the many forms of my apparatus that may be employed upon the ship.

Fig. 5ª is a diagram of a modified form of connection.

Fig. 6 represents a modified arrangement of the sectional conductors.

Fig. 7 is a plan view of phonograph records.

Referring to Fig. 1, the lines $a$, $a$ indicate a channel through which ship traffic is to be maintained. In or adjacent the channel, as by submerging them or otherwise disposing them, are the signaling conductors $b$ and $c$, disposed in sections or blocks of any suitable length. In the example illustrated, sections of each conductor are disposed on opposite sides of the channel, one side of the channel serving for traffic in one direction, while the other side serves for traffic in the opposite direction, the two directions of traffic being indicated by the arrows. In the example illustrated, there are shown on the right hand side of the channel three blocks or sections, which are indicated at 1, 3, 5, etc., for one side of the channel and 2, 4, 6, etc. for the other side of the channel.

At a control or terminal station G, upon shore, anchored ship, or the like, disposed at one end of the channel, or at any other suitable place, the conductors $b$ and $c$ are connected to earth or sea water at E, and their distant ends at the other end of the channel are similarly connected to earth or sea water at E. Upon the conductors $b$ and $c$ are impressed any suitable electric impulses, fluctuating or alternating current, having different characteristics. In the examples illustrated, S and S¹ represent sources of any such currents in circuit with the primaries of transformers whose secondaries are connected, respectively, in said conductors $b$ and $c$. In circuit with each of these sources is any modulating or signaling device M, which so controls the electric energy as to represent a signal, either telegraphic, telephonic or otherwise.

Ordinarily the sources S and S¹ will deliver fluctuating or alternating current of either audible or inaudible frequency for any of said modes of signaling, and when the signaling is telephonic, the frequencies of the sources S, S¹ will be above audibility or of radio frequency.

As to some aspects of my invention, however, it will be understood that the currents impressed upon the conductors $b$ and $c$ may be ordinary telephonic currents, in which case the sources S, S¹ may deliver direct current.

In any of the cases above referred to, it will be understood that the signaling current of whatever type may be impressed upon the conductors $b$ and $c$ in any other suitable way than by inductive coupling described. For example, as shown in Fig. 1ᵃ, a source, as S, and its modulator or control device $m$ may be connected in series with each other directly in the conductor $b$.

There may be employed a third conductor $d$ disposed, as to earth connections, as are conductors $b$ and $c$. With the conductor $d$ may co-operate a third source S² having a modulator or control instrument M, as in the other cases, the current from the source S² having a characteristic different from that of the currents of S and S¹.

Carried by the ship is a coil structure or other suitable energy absorbing structure which, in the example illustrated, comprises the two coils B and B¹, which may be disposed in any suitable position with respect to each other, preferably, however, on opposite sides of the ship. The coils B and B¹ may, for example, be submerged on opposite sides of the ship so as to be positioned as close as possible to the conductors $b$ and $c$, or they may, particularly with the higher frequencies of current impressed upon the conductors $b$ and $c$, be disposed above the sea surface, either inside or outside of the ship.

The absorbing or coil structure may be employed in connection with receiving apparatus of any suitable character, and may be employed also to control transmitting apparatus of any suitable character.

In Fig. 5 is shown one of many forms of apparatus which may be employed aboard the ship.

In the example illustrated, the coils B and B¹ have their terminals connected to the contacts $e$, $f$ and $g$, with which co-acts a switch $h$ for bringing either of the coils into co-action with detector of any suitable type. In the example illustrated, the detector or detector amplifier may be an audion V whose grid circuit may be connected to either one of the aforesaid coils. In the anode circuit of the audion are connected the telephone coils $i$, $i$ co-acting, respectively, with the diaphragms $j$ and $k$ disposed in suitable telephone ear pieces, the two diaphragms being in different ear pieces co-operating, respectively with the two ears of the operator.

Assuming a ship to enter the channel $a$ and desiring to steer along the right hand course thereof, when the coils B and B¹ are near the conductor $b$ of block No. 1, there will be heard in the telephones a signal characteristic of that impressed upon the conductor $b$ by the source S at the control or terminal station C. By shifting the switch $h$ backwardly and forwardly into communication with the different coils B and B¹, the operator can distinguish when the signal from one coil is weaker than that from the other and then alters his course so that the signals become of equal intensities, in which case the ship is properly directly over the conductor $b$.

If the source S delivers ordinary direct current, and if the modulator M is a telephone transmitter, an ordinary telephonic current will be impressed upon the conductor $b$, and the spoken message will be heard in the telephones whose diaphragms are $j$, $k$. The sound waves of the telephonic message may be uttered against the microphone M by a person, or by a phonograph record, as hereinafter described.

Where the source S delivers an alternating or fluctuating current having a frequency of, for example, 500 or 1000 cycles per second, the modulator M may be an automatic telegraphic transmitter sending out a characteristic letter or other signal which will be then heard as a high pitched note in the telephones. When the source S delivers alternating or fluctuating current of frequency above audibility, the device M may be a telephone transmitter for modulating such high frequency energy, in which case the sound waves uttered against the microphone M will be reproduced in the telephones, such sound waves being, for example, speech uttered by a person or by a phonograph record.

In case the source S delivers current of a frequency above audibility, or a current of radio frequency, the instrument M may be an automatic telegraph transmitter transmitting a characteristic letter or signal which, if the oscillations produced by the source S are in separate trains or groups, will become audible in the telephones as a sound or note of the wave train or group frequency. If the oscillations or current delivered by the source S are, however, sustained or undamped waves, the switch $m$, Fig. 5, may be closed, causing the source $S^3$, delivering sustained oscillations or alternating current of frequency slightly different from the frequency of the source S, to impress a potential variation of similar frequency upon the grid circuit of the audion V, whereby there will be produced in the telephones a beat note, as well understood in the radio art.

After the ship has traversed the conductor $b$, it will leave the block 1 and enter block 3 into co-operative relation with a section of the conductor $c$ traversed by current from the source $S^1$. The characteristic of the current in conductor $c$ is different from that in conductor $b$, and such different characteristic will become apparent in the telephones. The current itself may have a different characteristic, as of different frequency, wave train frequency or the like, or, (and) the modulator M associated with the source $S^1$ may control the current therefrom in a characteristic way to produce a different telegraphic signal or letter, or a different spoken message. The operator upon the ship will accordingly know by the change of characteristic that he has entered block 3, and so on, as he enters each successive block, he will become aware of it.

As indicated in Fig. 1, the conductors $b$ and $c$ may overlap each other for short distances, with the result that when the ship traverses the overlap two characteristic signals will be simultaneously heard in the telephones, the operator then knowing that he is over the overlap and is just leaving one block and entering another. For example, when the sources S and $S^1$ produce currents of audible or super-audible frequencies differing suitably from each other, there will be produced in the coils B and $B^1$ electric beat currents which will become manifest as audible beats in the telephones.

Upon the ship an audion $V^1$, or other suitable means, may be subjected to the currents induced in either of the coils B and $B^1$, by connecting the primary of transformer $n$ to terminals $e, f,$ or $f, g$, as indicated in Fig. 5ª. In the example illustrated, $V^1$ is subjected to the currents induced in both coils, the two coils B and $B^1$ preferably being cumulative in their effect upon the primary of the transformer $n$ in whose secondary circuit, which may be tuned by the condenser K, is the grid circuit of the audion $V^1$ and in whose anode circuit is the primary, which may be shunted by condenser $K^1$, of a transformer $o$, which may be an audio frequency transformer, whose secondary is connected by the switch $p$ with radio transmitting apparatus of any suitable character. In the example illustrated, the secondary of the transformer $o$ controls apparatus $q$, as one or more thermionic oscillators, which produce high or radio frequency oscillations modulated or controlled by the current from the secondary of the transformer $o$. These oscillations may be amplified, as by one or more stages of thermionic amplifying apparatus indicated at $r$, whose output circuit, which may be tuned by the condenser K, is coupled to the radiating structure or antenna A.

By the structure described, not only are the signals heard by the operator in his telephones, but the telegraphic, telephonic or other signals received by the coils B, $B^1$ control the emission of electro-radiant energy modulated or controlled in accordance with the signal picked up upon the ship. The signal is therefore relayed upon the ship and transmitted by radio, whereby another ship or ships traversing the same side of the channel $a$, or otherwise located, and either ahead of or behind the ship under consideration, will receive the characteristic signal and will thereby know that there is a ship in a certain block, as for example, block 1. The same radio message may be received at the control or terminal station C, as by suitable radio receiving apparatus generically indicated at R. The operator at R then also knows that a ship occupies a certain block, as block 1, and he can, as when the devices M are microphones, speak into them stating, for example, that there is a ship in block 1, this message being then received by all other ships in co-operative relation with the conductors $b$ and $c$. Or in lieu of transmitting such information telephonically, it may be telegraphically transmitted over the conductors $b$ and $c$.

Upon the same ship under consideration may be radio receiving apparatus of any suitable character comprising, for example, an antenna $A^1$, preferably so associated with the antenna A that the transmission of energy from the antenna A simultaneously with reception of energy by the antenna $A^1$ will not cause interference or prevent intelligible receipt of the message represented by the energy absorbed by the antenna $A^1$. One of the well known arrangements for this non-interfering transmission and reception of energy is indicated in Fig. 5. With the receiving apparatus is associated an audion or other suitable device $V^2$, whose grid circuit is connected across the tuning condenser $K^3$. In the anode circuit of the tube $V^2$ are connected the telephone coils $s, s$, which may be shunted by the condenser $K^4$, co-acting, respectively, with the aforesaid diaphragms $j$ and $k$ of the operator's telephone, a switch $t$ serving to open or close the circuit of the coils $s, s$.

While the operator upon the same ship under consideration, as one traversing the right side of the channel $a$, Fig. 1, may in his telephones hear the characteristic signals and steer his ship thereby, and while the received signals are being transmitted to other ships and to the terminal or control station, he may at the same time hear in his telephones, by the action of the coils $s, s$, signals or messages received by the antenna $A^1$. These signals or messages may be those automatically transmitted, as above described, from another ship in another block, whereby the operator, in addition to receiving steering signals, will receive in his telephone signals from another ship in another block and so become aware of the presence of another ship. This signal or message so received from another ship may give information as to what block the ship is in, such message being either automatically transmitted by the ship, or impressed upon the conductors $b, c$ by the operator at the control or terminal station.

The same characteristic action takes place with a ship passing in opposite direction on the opposite side of the channel $a$.

Should a ship on either side of the channel depart widely from its course toward the opposite side of the channel, the coils $B, B^1$ will come under the influence of the conductor $d$, over which is transmitted a current representing a warning signal which will be heard by the operator in his telephone, whereupon he may cause his ship to return to proper side of the channel. The signal in the conductor $d$ may be telegraphic or telephonic, either produced by an operator or automatically by an automatic transmitter or a phonograph. For example, the modulator $M$ associated with the source $S^2$ may be a phonographically controlled microphone, the phonograph uttering repeatedly a given slogan or message, which informs or warns the operator upon the ship of its departure from proper position in the channel.

While the apparatus $R$ at the control station $C$ has been referred to as receiving apparatus, it will be understood that it may be suitable also for transmission of radio signals or messages, or that it may be of the character illustrated in Fig. 5, or equivalent, whereby simultaneous or non-interfering transmission and reception may be effected.

Whereas in Fig. 1 the conductors $b$ and $c$ are transposed and cross or recross the channel $a$ to form the sections, these sections may be otherwise formed, as for example, as indicated in Fig. 2, where the sections of conductor $b$, on each side of the channel, each has one end connected to a supply conductor associated with the source $S$, and similarly, one end of each of the sections of conductor $c$ is connected to a supply conductor associated with the source $S^1$.

In this instance again the sources $S^1$, $S^2$ and their modulators $M$ may be of any of the characters described in connection with Fig. 1. And neighboring sections or blocks may overlap, as described in connection with Fig. 1.

In Fig. 3, for each sectional conductor there is a different source of current $S^3$, whereby the current for each section is different as to a characteristic from every other section. While in Figs. 1 and 2 alternate sections on the same side of the channel have the same characteristic current, in Fig. 3 all sections differ characteristically from each other, and this arrangement is particularly more suitable where automatic transmitting apparatus, such as shown in Fig. 5, is employed, for in such case a different characteristic signal would be sent out from each block the ship occupies, and accordingly the operators on the other ships would know exactly, due to automatic action simply, which block or blocks is or are occupied, due to employment of receiving apparatus having antenna $A^1$, or the like, as indicated in Fig. 5.

Thus, with a ship in block 3, Fig. 3, the operator on that ship would know by the characteristic signal that he is in that block, and the automatic transmitting apparatus on the ship will automatically transmit from the antenna $A$ a signal characteristic of block 3, to ships in other blocks, or otherwise situated, and to the control station $C$. And at the control station $C$, as above stated, the operator may talk into any of the modulators, or control them telegraphically, to advise any ship in any particular block that there is a ship in any other particular block.

In Fig. 4 the arrangement is similar to that in Fig. 3, except that the currents of the different sources are impressed upon a single feed conductor, and by tuning devices $v$, each comprising tuning capacity and inductance, the currents are selected to the different conductor sections, each receiving a current of characteristic frequency.

In Fig. 4 the modulators are indicated as microphones, though it will be understood that they may be any other type of control instrument, as automatic or manually operated telegraph transmitters, etc. In this case, when the sources $S^4$ associated with the microphones are either direct current sources or sustained waves of super-audible or radio frequencies, telephonic messages may be communicated to the sectional conductors and from them through the coils $B, B^1$ to the ship's operator, and also to the ship's automatic radio re-transmitting apparatus, the operators on all other ships thereby knowing of the presence of a certain ship in a certain block, and the operator at the terminal station also being aware of the position of each ship.

In all of the arrangements described it is possible, in addition to the guiding and signaling described, to permit a passenger on the ship to hold conversation with another party at any distant station upon land. In such case the operator at the control or terminal station $C$ causes the receiver responding to the voice of the person at the distant station to affect the current impressed upon the submerged conductor or conductors through which and the coils B, B¹ upon the ship the passenger may hear the voice of such person by applying to his ears the telephones whose diaphragms are $j$ and $k$. He may reply, by shifting switch $p$ to its other position indicated in Fig. 5, and by speaking to the microphone $w$ which then controls the devices $q, r$ and radiation of his message from the conductor A. This message is received upon the radio apparatus R at the terminal station and there impressed upon the line running to the distant station, and the person thereat will hear the message spoken to the microphone $w$ upon the ship. There is afforded, therefore, a signaling circuit, either telegraphic or telephonic, part of which may be a land line, and a part of which is a conductor system inductively influencing apparatus upon the ship, complemented by radio transmitting apparatus upon the ship.

Or the non-interfering transmitting and receiving apparatus, employing the antennæ A, A¹ upon the ship, may co-act with similar apparatus at the control station C, where the apparatus thereat is related to the land line, by means known in the art.

While in Figs. 1, 2, 3 and 4 an overlap between the sectional conductors is shown, it will be understood that they need not overlap, but simply come close to each other end to end. Or, as indicated in Fig. 6, the conductors of different sections, as the conductors $x$, $y$ and $z$, each preferably carrying a characteristic signaling current, may be slightly spaced from each other, as at $a^1$, $a^1$, whereby the conductor sections will not inductively influence each other to any material extent, the gaps $a^1$ being sufficiently short that in passing from one section to the next the ship will not vary materially from its course.

In any of the arrangements of Figs. 1 to 4 inclusive, the modulators M may be microphones in each instance controlled by a phonograph record of either telegraphic signals or of sound waves, as a spoken word or message.

As indicated in Fig. 7, the phonograph records, indicated at P, may have a single circular record groove $b^1$, each representing a different characteristic signal or message, the records P all simultaneously rotating, and for each revolution producing the characteristic signal or message control of the microphone co-acting with the stylus controlled by each record.

While the modulators may thus be automatically controlled by a phonograph record or otherwise, the operator at the control or terminal station may superimpose upon the the same circuits another telegraphic or spoken message.

It is to be understood that the term "ship" as appears herein and in the appended claims, is used in a comprehensive sense to include generally, moving vehicles of all types and characters, particularly those used in transportation.

What I claim is:

1. The method of guiding a ship, which consists in producing electrical disturbances representing different signals in guide conductor sections in the ship's path, producing electrical disturbances in a warning signal conductor, and producing by said disturbances a warning signal and different guiding signals upon said ship.

2. The method which consists in producing electrical disturbances representative of different signals in conductor sections in a ship's path, absorbing energy of said disturbances upon the ship, and re-transmitting from the ship signals corresponding with the signals represented by the absorbed energy.

3. The method which consists in producing electrical disturbances representative of different signals in conductor sections in a ship's path, absorbing energy of said disturbances upon the ship, re-transmitting from the ship signals corresponding with the signals represented by the absorbed energy, and translating absorbed energy into intelligible signals as the ship comes into co-operative relation with the different conductor sections.

4. The method which consists in producing in a conductor in a ship's path electrical disturbances representing a signal, absorbing energy of said disturbances on the ship, and re-transmitting from the ship signals corresponding with the signals represented by the absorbed energy.

5. The method which consists in producing in a conductor in a ship's path electrical disturbances representing a signal, absorbing energy of said disturbances on the ship, and transmitting from the ship radiant energy controlled by the absorbed energy.

6. The method which consists in producing in a conductor in a ship's path electrical disturbances representing a signal, absorbing energy of said disturbances on the ship, re-transmitting from the ship signals corresponding with the signals represented by the absorbed energy, and translating into signals energy absorbed on the ship.

7. The method which consists in producing in a conductor in a ship's path electrical disturbances representing a signal, absorbing energy of said disturbances on the ship, transmitting from the ship radiant energy controlled by the absorbed energy, and translating into signals energy absorbed on the ship.

8. The method which consists in producing electrical disturbances representative of different signals in conductor sections in a ship's path, absorbing energy of said disturbances upon the ship, and transmitting from the ship radiant energy controlled by absorbed energy.

9. In a ship's signaling system, the combination with a conductor in the ship's path, of means for impressing thereon current representative of a signal, means upon the ship for absorbing energy of said current, and means on said ship for transmitting signals to a station distant from said ship controlled by the absorbed energy.

10. In a ship's signaling system, the combination with a conductor in the ship's path, of means for impressing thereon current representative of a signal, means upon the ship for absorbing energy of said current, and means on the ship for transmitting therefrom radio frequency electrical energy controlled by the absorbed energy.

11. In a ship's signaling system, the combination with a conductor in the ship's path, of means for impressing thereon current representative of a signal, means upon the ship for absorbing energy of said current, means on said ship controlled by the absorbed energy for transmitting signals to a station distant from the ship, and means on the ship for translating absorbed energy into intelligible signals.

12. In a ship's signaling system, the combination with a conductor in the ship's path, of means for impressing thereon current representative of a signal, means upon the ship for absorbing energy of said current, means on the ship for transmitting therefrom radio frequency electrical energy controlled by the absorbed energy, and means on the ship for translating absorbed energy into intelligible signals.

13. In a ship's signaling system, the combination with conductor sections in the ship's path, means for producing in different sections electrical effects capable of producing different signals, means on the ship for absorbing energy from said sections, and apparatus on the ship controlled by the absorbed energy for transmitting signals to a station distant from the ship.

14. In a ship's signaling system, the combination with conductor sections in the ship's path, means for producing in different sections electrical effects capable of producing different signals, means on the ship for absorbing energy from said sections, and means on said ship for transmitting therefrom radio frequency electrical energy controlled by the absorbed energy.

15. In a ship's signaling system, the combination with conductor sections in the ship's path, means for producing in different sections electrical effects capable of producing different signals, means on the ship for absorbing energy from said sections, apparatus on the ship controlled by the absorbed energy for transmitting signals to a station distant from the ship, and means on the ship for translating into intelligible signals energy absorbed from said sections.

16. In a ship's signaling system, the combination with conductor sections in the ship's path, means for producing in different sections electrical effects capable of producing different signals, means on the ship for absorbing energy from said sections, means on said ship for transmitting therefrom radio frequency electrical energy controlled by the absorbed energy, and means on the ship for translating into intelligible signals energy absorbed from said sections.

17. In a ship's signaling system, the combination with a conductor in the ship's path, means for impressing electrical energy thereon representative of a signal, means on the ship for absorbing energy from said conductor, radio transmitting and receiving apparatus on the ship, the transmitting apparatus being controlled by energy absorbed from said conductor, and signal translating means responsive to energy absorbed from said conductor and to radiant energy received by said radio receiving apparatus.

18. In a ship's signaling system, the combination with a conductor in the ship's path, means for impressing electrical energy thereon representative of a signal, means on the ship for absorbing energy from said conductor, radio transmitting and receiving apparatus on the ship simultaneously operative without interference, the transmitting apparatus being controlled by energy absorbed from said conductor, and signal translating means responsive to energy absorbed from said conductor and to radiant energy received by said radio receiving apparatus.

19. In a ship's signaling system, the combination with a conductor in the ship's path, of means for impressing thereon electrical energy representative of a signal, means on the ship for absorbing energy from said conductor, apparatus on said ship controlled by energy received from said conductor for transmitting signals to a station distant from the ship, and means on the ship for controlling said transmitting apparatus independently of said absorbed energy.

20. In a ship's signaling system, a series of conductor sections for each of a plurality of guiding paths, and means for impressing currents of different characteristics upon different sections of each series, the currents in adjacent sections of different series in the different guiding paths having different characteristics.

21. In a ship's signaling system, a conductor for each of a plurality of guiding paths, and means for impressing upon the different conductors currents of different characteristics, said conductors being transposed from one guiding path to another whereby in each guiding path there is in effect a series of conductor sections traversed respectively by currents of different characteristics.

22. In a ship's signaling system, means on the ship for absorbing electrical energy from a conductor in the ship's path, and apparatus on said ship controlled by the absorbed energy for transmitting signals to a station distant from the ship.

23. In a ship's signaling system, means on the ship for absorbing electrical energy from a conductor in the ship's path, and radio transmitting apparatus on said ship controlled by the absorbed energy.

24. In a ship's signaling system, means on the ship for absorbing electrical energy from a conductor in the ship's path, apparatus on said ship controlled by the absorbed energy for transmitting signals to a station distant from the ship, and signal translating means on the ship responsive to the absorbed energy.

25. In a ship's signaling system, means on the ship for absorbing electrical energy from a conductor in the ship's path, radio receiving apparatus on the ship, and a telephone simultaneously responsive to energy received by said receiving apparatus and by energy absorbed by said first named means.

26. In a ship's signaling system, the combination with a conductor in the ship's path, of means for impressing thereon electrical energy representative of a signal, means on the ship for absorbing energy from said conductor, radio transmitting and receiving apparatus on the ship, means rendering said receiving apparatus unresponsive to said transmitting apparatus, means for controlling said transmitting apparatus by said energy absorbed from said conductor, and signal-translating means responsive to radiant energy received by said receiving apparatus.

27. In a ship's signaling system, the combination with a conductor in the ship's path, of means for impressing thereon electrical energy representative of a signal, means on the ship for absorbing energy from said conductor, radio transmitting and receiving apparatus on the ship, means rendering said apparatus simultaneously operative without interference, signal-translating means responsive to radiant energy received by said receiving apparatus, means for controlling said transmitting apparatus by energy absorbed from said conductor, and means for independently controlling said transmitting apparatus.

28. In a ship's signaling system, the combination with a conductor in the ship's path, of means for impressing thereon electrical energy representative of a signal, means on the ship for absorbing energy from said conductor, radio receiving apparatus on the ship, and a telephone receiver having coils controlled, respectively, simultaneously by energy absorbed from said conductor and received by said radio receiving apparatus.

29. In a ship's signaling system, in combination a guiding conductor, means for impressing a fluctuating current thereon, means on said ship for transmitting intelligence to a distance from the ship through a medium other than a conductor, means on said ship for controlling said transmitting means by energy absorbed from said conductor, and means for controlling the current in said conductor to impart intelligence to a ship.

In testimony whereof I have hereunto affixed my signature this 3rd day of December, 1920.

CORNELIUS D. EHRET.